Jan. 22, 1946.                    O. STEINER                         2,393,575
           MEANS FOR OPERATING AERIAL CAMERAS FOR
            MAKING FLASHLIGHT AERIAL PHOTOGRAPHS
                   Filed Jan. 6, 1944               7 Sheets-Sheet 3
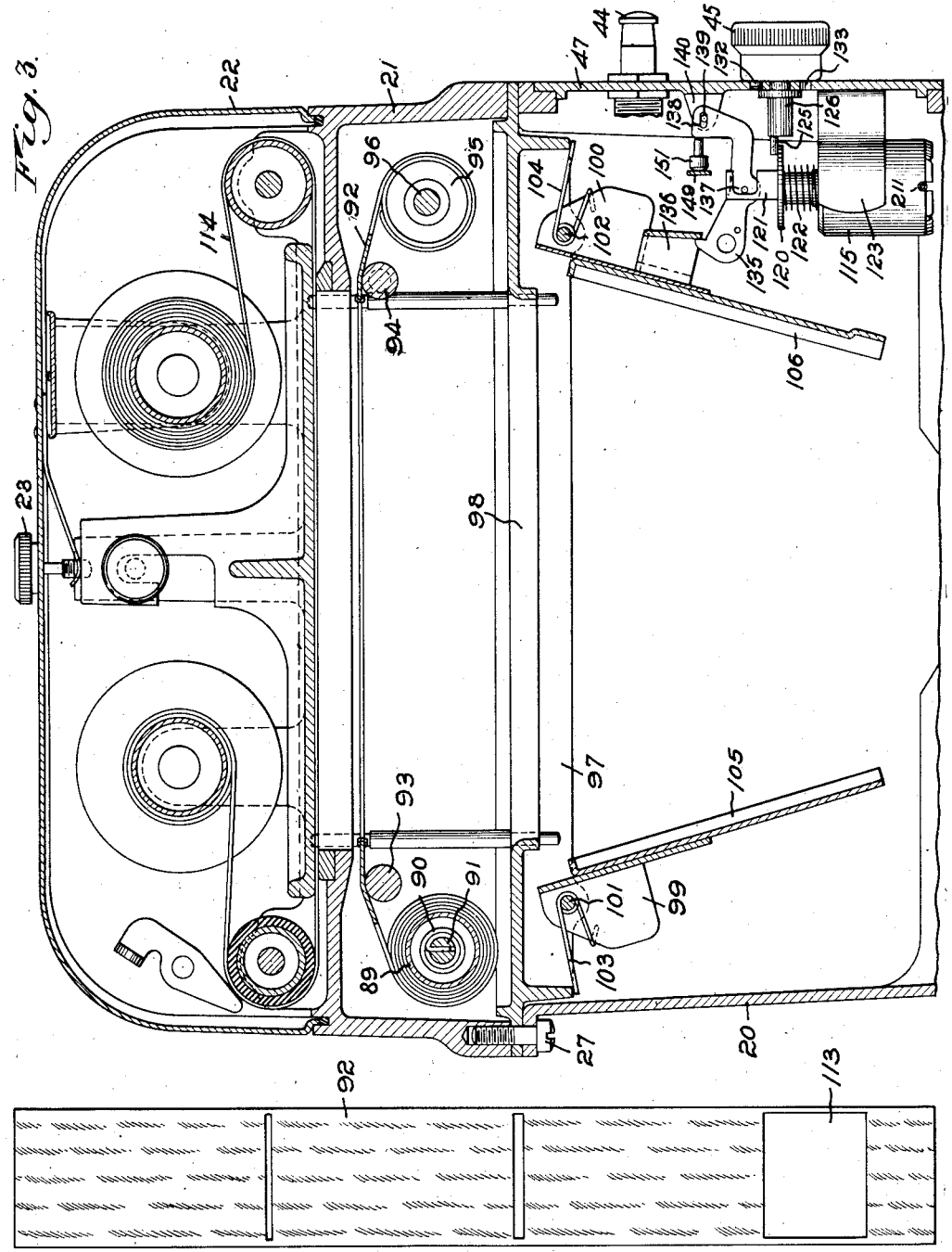
INVENTOR.
Oscar Steiner
BY
his Attorneys

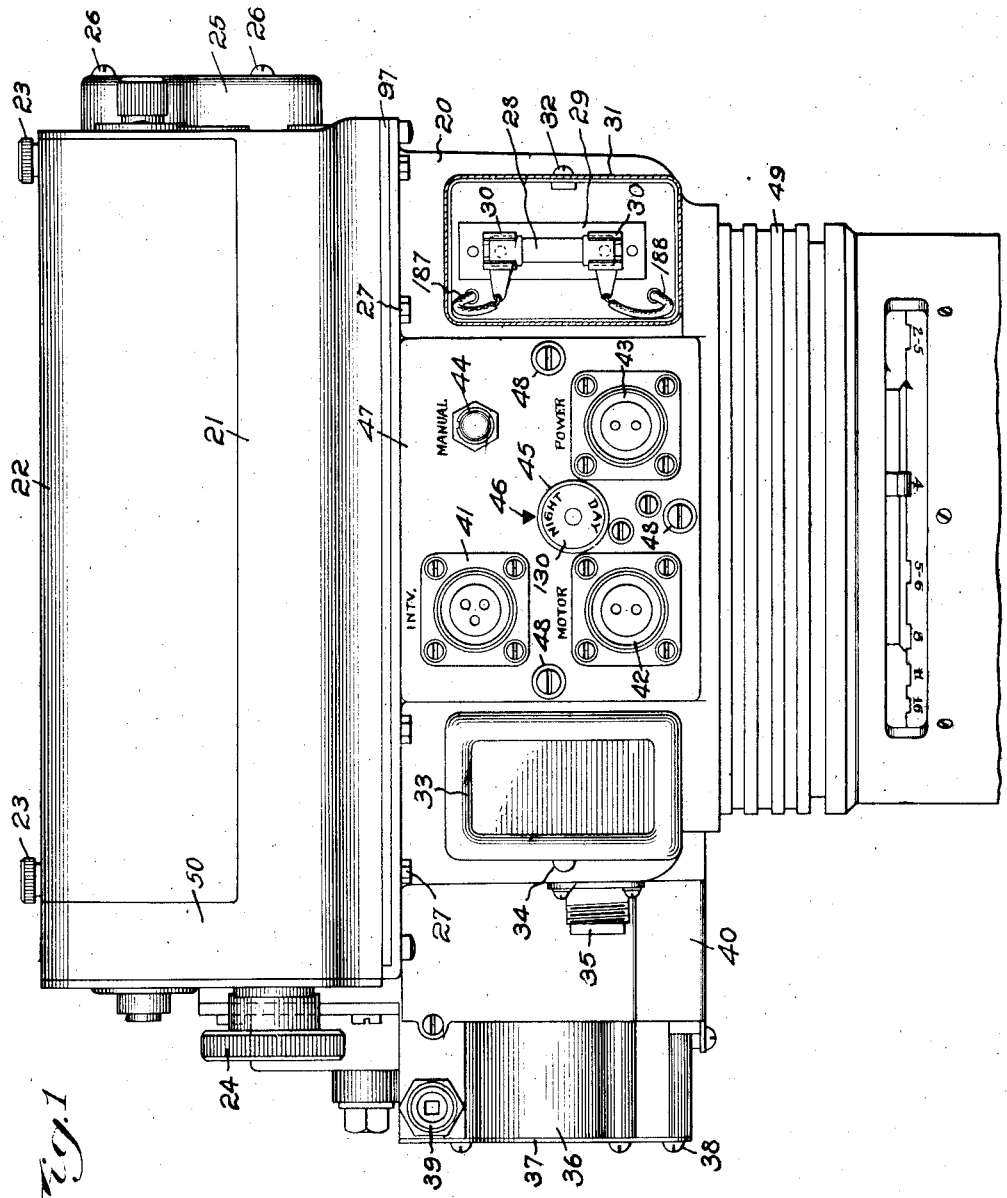

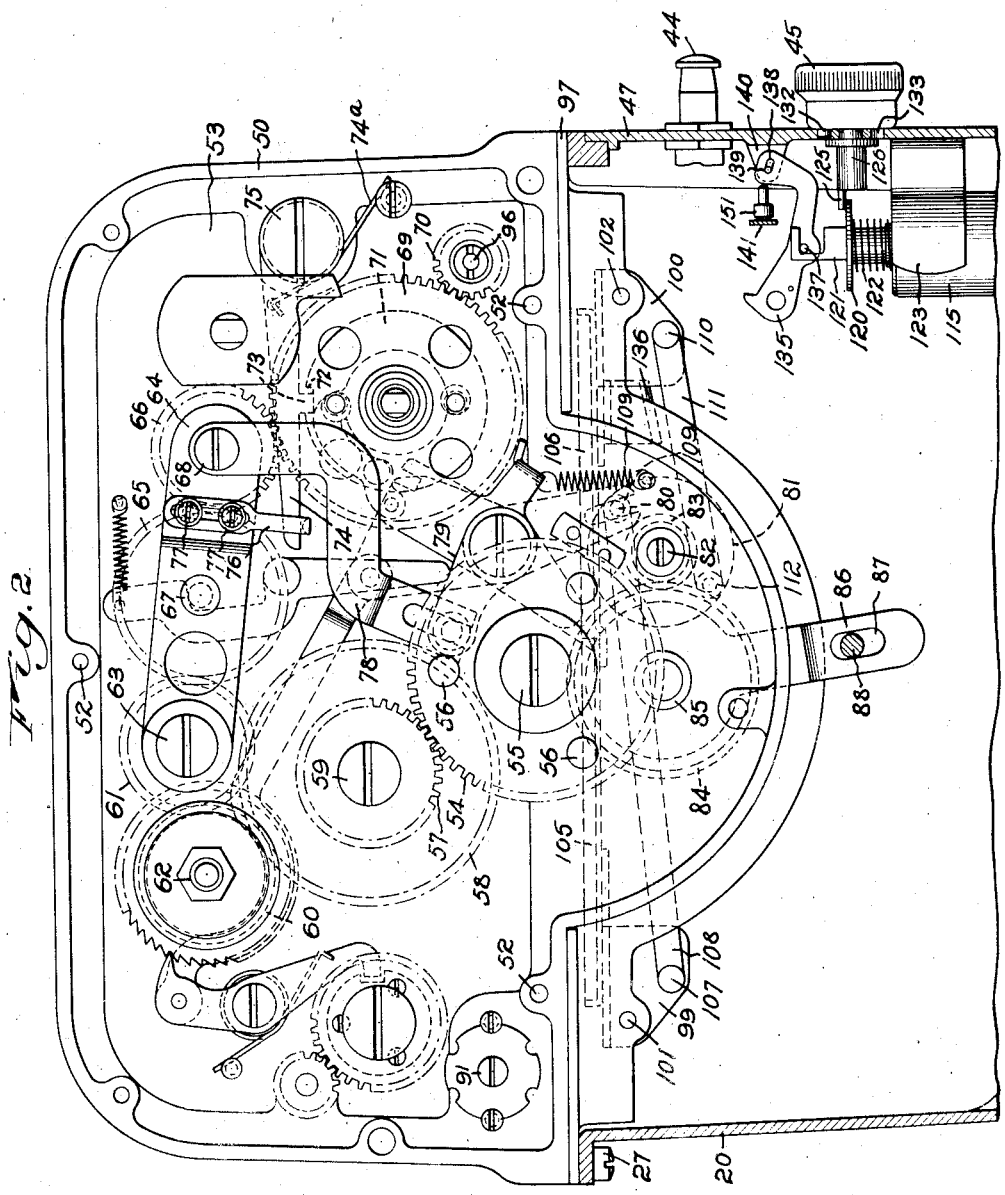

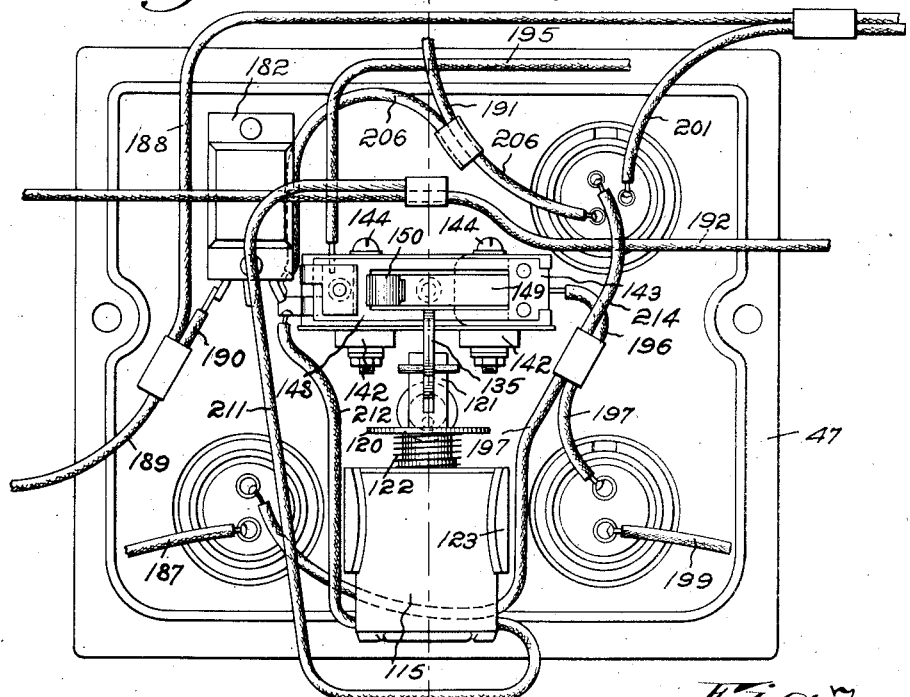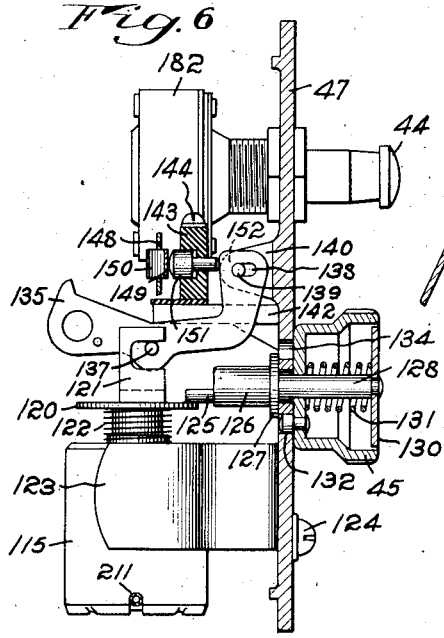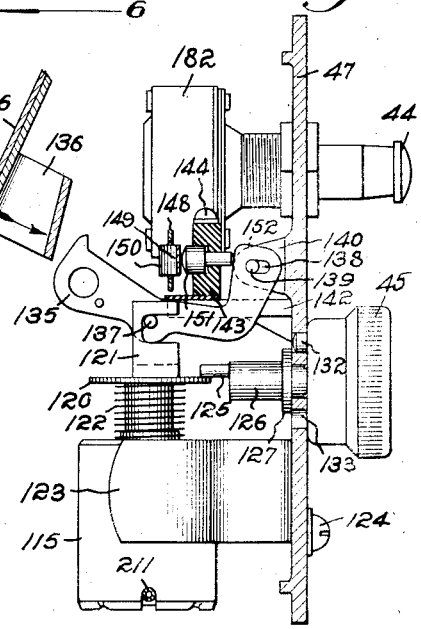

Jan. 22, 1946.   O. STEINER   2,393,575
MEANS FOR OPERATING AERIAL CAMERAS FOR
MAKING FLASHLIGHT AERIAL PHOTOGRAPHS
Filed Jan. 6, 1944   7 Sheets-Sheet 5

INVENTOR.
Oscar Steiner.
BY
his Attorneys.

Jan. 22, 1946.　　　O. STEINER　　　2,393,575
MEANS FOR OPERATING AERIAL CAMERAS FOR
MAKING FLASHLIGHT AERIAL PHOTOGRAPHS
Filed Jan. 6, 1944　　　7 Sheets-Sheet 6
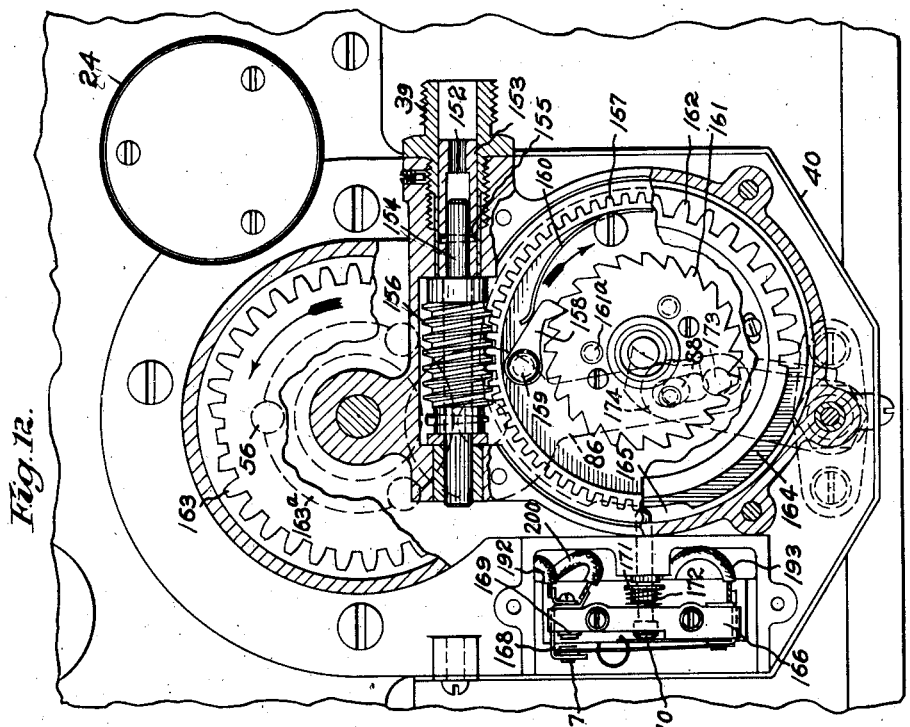
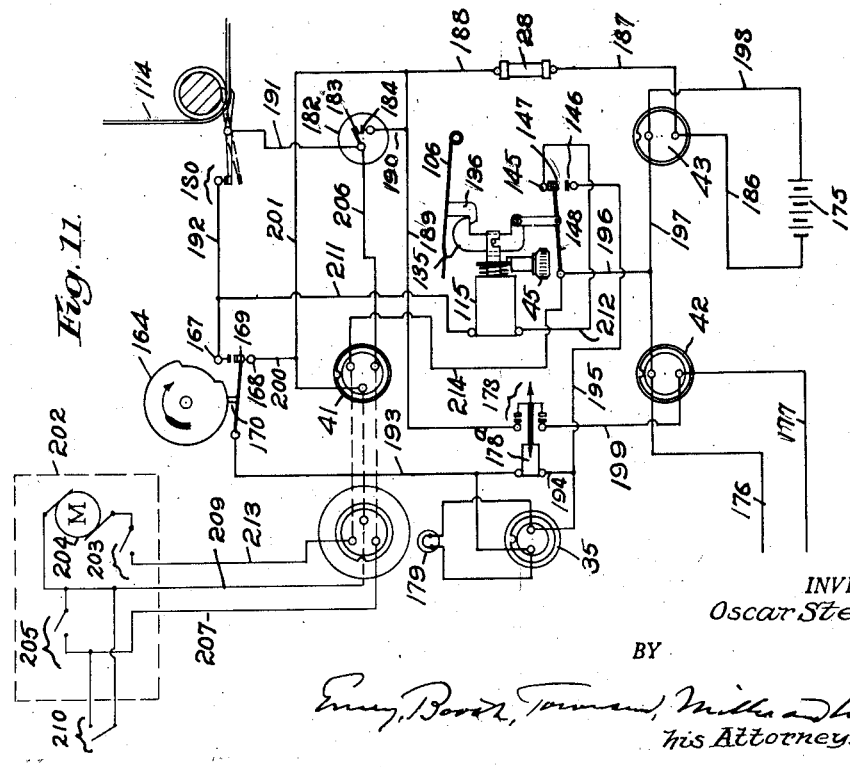
INVENTOR.
Oscar Steiner:
BY
his Attorneys.

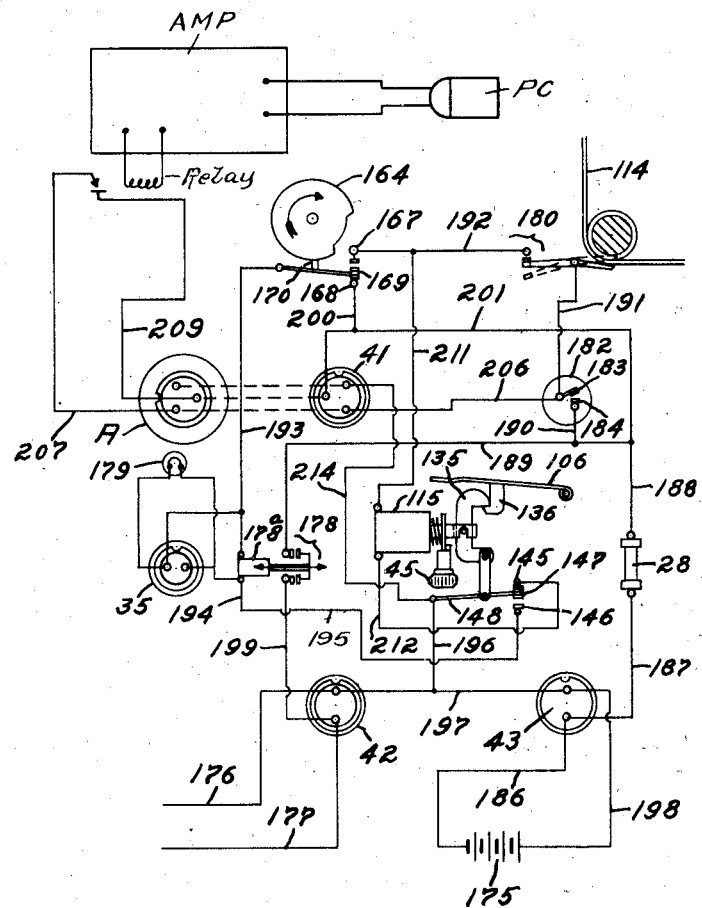

Patented Jan. 22, 1946

2,393,575

UNITED STATES PATENT OFFICE 2,393,575

MEANS FOR OPERATING AERIAL CAMERAS FOR MAKING FLASHLIGHT AERIAL PHOTOGRAPHS

Oscar Steiner, Rochester, N. Y., assignor to Graflex, Inc., Rochester, N. Y., a corporation of Delaware Application January 6, 1944, Serial No. 517,186

32 Claims. (Cl. 95—12.5)

This invention relates to improved means for operating an aerial camera for making flashlight aerial photographs. For this disclosure, I am showing my invention as applied to a camera that is the subject-matter of a co-pending application, Ser. No. 476,456, now patent No. 2,371,592, March 13, 1945, in which I appear as co-inventor. Practically all of the structure herein disclosed is shown and described in the above-mentioned application, but the subject-matter claimed by this application was not claimed therein, nor is my herein claimed invention limited to the use of the camera shown in said co-pending application.

In the drawings:

Fig. 1 is a front elevation of the camera, clearly showing the electrical control panel thereof;

Fig. 2 is a left side elevation of Fig. 1, partly in transverse section, and having some parts removed most clearly to show the shutter rewinding mechanism, the capping gate latching mechanism being also shown as in condition to engage the capping gate means after they have been opened and start to close;

Fig. 3 is a transverse section through Fig. 1 showing the capping gate means in the open condition and held from closing by the synchronizer mechanism, the shutter curtain being shown with the full open aperture in position to cause an exposure of the sensitized material;

Fig. 4 is a detail of the shutter curtain showing the several exposure apertures;

Fig. 5 is a detail in elevation of the capping gate control mechanism mounted on the electrical control panel itself shown removed from the camera and viewed as from the inside of the camera;

Fig. 6 is a section through Fig. 5 on the line 6—6 thereof, showing the capping gate latching mechanism in its inactive condition or day cycle;

Fig. 7 is a view similar to Fig. 6, but with the capping gate latching mechanism placed in active or latching condition and capping gate means about to be engaged by said mechanism;

Fig. 11 is a circuit diagram of the camera circuit and the control circuit;

Fig. 11A is a circuit diagram similar to Fig. 11, but containing a photocell, amplifier and relay instead of the intervalometer; and Fig. 12 is a side elevation of the camera, mainly in transverse section, with certain parts broken away to show the camera drive mechanism and motor control switch for operating the camera.

Figure 8:
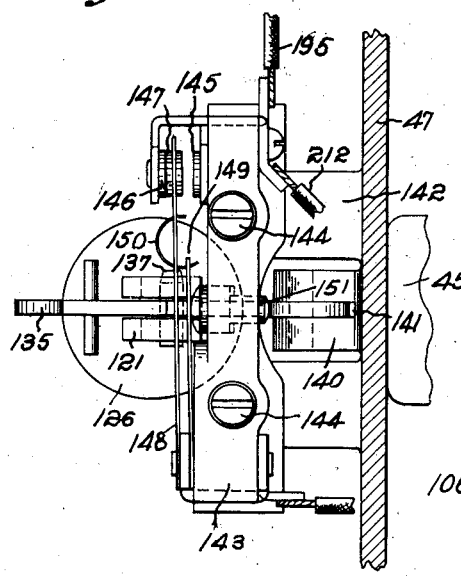
Fig. 8 is a top plan view partly in section of the capping gate latching mechanism after the capping gate means has been released and also clearly showing the electrical switch.

The important objects of this invention are: to provide a structure for a camera particularly of the aerial type wherein said camera can be caused to have its usual cycle of operation modified for the purpose of making flashlight exposures; to provide means for holding open the capping gate mechanism of a camera that would otherwise normally close; to provide means for changing the conditions in an electrical circuit when the capping gates are open; to provide means for releasing the capping gates through a change in the electrical circuit; to provide means again to change the electrical circuit when the capping gates have been released; and to provide means for conveniently putting the control mechanism for flash synchronization into operation and removing it therefrom. Other important objects will be apparent upon reference to the drawings and to the ensuing detailed description.

Referring first to Fig. 1 of the drawings, the camera body is indicated at 20 and the magazine portion at 21, it being provided with a magazine cover 22 held in place by screws 23, 23. A shutter setting knob is indicated at 24 and a film supply indicator switch housing at 25, the latter being held in proper relation to the magazine portion 21 by screws 26, 26, the said magazine portion being held to the camera body 20 by a series of screws or bolts 27, 27. A motor circuit fuse is indicated at 28, it being fitted to a fuse block 29 having fuse clips 30, 30 and fuses enclosed by a cover 31 held in place by means of screws 32. A camera motor relay cover is indicated at 33, it being held in place by screw 34. A receptacle for a signal lamp is indicated at 35 and a motor drive housing at 36 having a cover 37 attached by a screw 38. A flexible shaft connection is indicated at 39 and a second mechanism housing cover is indicated at 40. An intervalometer receptacle is indicated at 41, a motor receptacle at 42, a power receptacle at 43, a motor operating button at 44 and a day and night control at 45, to be referred to more particularly when explaining in detail the operation of the camera, it being here noted that when the control knob 45 is in one position, the camera functions in what is known as the day cycle and when such control knob is in the opposite position the camera functions in what is known as the night cycle, wherein there is a compensatingly longer exposure period. An index mark is indicated at 46 that is used in connection with the control knob 45.

The specified parts 41 to 46 are mounted on a synchronizer mechanism panel or plate 47 which is desirably a casting of any suitable material held to the camera body 20 by screws 48, 48. Attached to the camera body 20 is a lens cone 49 of usual construction and hence not requiring further description.

In Fig. 2 is shown the camera mechanism for rewinding the shutter, for feeding a new area of film, for releasing the shutter and for opening the capping gates, all of which mechanism constitutes no direct part of the present invention, but it is necessary to describe fully the operation of the camera with respect to the various mechanisms thereof so that the invention herein claimed will be fully understood.

Referring particularly to Fig. 2 and also to Fig. 1, the camera magazine portion 21 has provided on the left-hand end thereof viewing Fig. 1, a housing structure 50 for housing the said magazine portion 21, the said housing being provided with a cover 51 held to the housing 50 by suitable screws engaging threaded openings 52, 52. The said housing 50 has an inner wall 53 on which the camera mechanism is mounted, and which inner wall will be hereinafter referred to as the mechanism support plate.

Mounted upon said mechanism support plate 53 is a gear 54 by means of a shoulder screw 55, said gear 54 being provided with a series of pins 56 that engage the motor drive mechanism and such parts will be more fully referred to when describing the appropriate part of the camera mechanism. The said gear 54 meshes with a pinion 57 attached to a gear 58 and turning as a unit on a shoulder screw 59. The said gear 58 meshes with a film clutch gear 60, shown in dotted lines, and meshing with an idler gear 61. The said clutch gear 60 is mounted on a film take-up shaft 62 and is connected to the shaft 62 by means of a clutch mechanism for driving the film spool. The said idler gear 61 is mounted on a shoulder screw or stud 63, and also pivotally mounted on said screw or stud 63 is a movable arm or lever 64 carrying a gear 65 and a pinion 66, the said gear 65 being held to the arm or lever 64 by a shoulder rivet 67, and the pinion 66 being held to the movable arm or lever 64 by a suitable stud and screw 68.

The said pinion 66 meshes with a shutter rewind gear 69 when the shutter is being rewound, and is disengaged therefrom when making an exposure. The said shutter rewind gear 69 meshes with a shutter curtain roller pinion 70, the said shutter rewind gear 69 being provided with a latch plate 71 having a notch 72 engaged by a pawl 73 of a shutter release lever 74 when the shutter is in a fully rewound condition. The said shutter release lever 74 is pivoted on a shoulder screw 75 on the mechanism support plate 53, and it is caused to be turned in a contraclockwise direction by a spring 74a. The said shutter release lever 74 is operated by a shutter release link 76 attached to the movable arm or lever 64 by screws 77, 77. The said movable arm or lever 64 is operated through a link 78, a bell crank 79 and a pin 80 of the capping gate operating disk indicated in dotted lines at 81. The said capping gate operating disk 81 is pivoted on a suitable shoulder screw 82 attached to the mechanism support plate 53, and it is provided with a pinion 83, shown in dotted lines, and engaged by a gear 84, also shown in dotted lines, carried by a stud 85 attached to the said mechanism support plate 53. Attached to the said gear 84, in any suitable manner, is an arm 86, shown in full lines, having a lengthwise extending slot 87 receiving a pin 88 of the motor drive and control mechanism to be hereinafter referred to more in detail.

When the gear 54 is turned in a contraclockwise direction, the shutter rewind gear 69 will also be turned in a contraclockwise direction through the described gear train, and the shutter rewind pinion 70 will be caused to turn in a clockwise direction until the shutter is fully rewound, at which time the notch 72 of the shutter release plate 71 will be engaged by the projection 73 of the shutter release lever 74 and the shutter will then be in fully rewound condition.

When the gear 84 is turned by means of the pin 88 of the motor drive and control mechanism, and the lever 86 is accordingly moved in a clockwise direction, the pinion 83 will be caused to turn in a contraclockwise direction, carrying with it the capping gate operating disk 81. The said pin 88 will cause the bell crank 79 to be turned in a clockwise direction, thus disengaging the gear 66 from the shutter rewind gear 69, and at the same time the shutter release lever 74 will be turned in a clockwise direction through the link 76, thus disengaging the projection 73 of the lever 74 from the notch 72 and from the shutter release plate 71. The shutter curtain will now be allowed to run down because of the tension roller 89 thereof, shown in Fig. 3.

Referring further to Fig. 3 of the drawings, the shutter curtain rollers and the shutter curtain are shown in section therein, the shutter tension roller being indicated at 89, the shutter tension roller spring at 90, the tension roller shaft at 91, the shutter curtain at 92, one shutter curtain idler at 93 and another shutter curtain idler at 94. The shutter curtain take-up roller is indicated at 95 and the shutter curtain take-up roller shaft at 96.

Between the camera body 20 and the magazine portion 21 is fitted a plate 97 provided with an opening 98 through which light passes when making an exposure. Pivoted to the said plate 97 are capping gate hinges 99 and 100 by means of pins 101 and 102 respectively. The said hinge 99 is caused to be rotated in a contraclockwise direction viewing Fig. 3 by a spring 103, and the said hinge 100 is caused to be turned in a clockwise direction by means of a similar spring 104.

Attached to the said hinge 99 is a capping gate 105 of plate-like form that may be referred to as of a general pan-shaped formation, and attached to the said hinge 100 is a capping gate 106 desirably of a similar formation. When the said capping gates 105, 106 are in closed condition, they will close the light entrance opening 98 to prevent the passage of light through the camera lens to the sensitized material. The said capping gates 105, 106 are shown in closed condition in dotted lines in Fig. 2, in which figure there is shown attached to the hinge member 99 by a shoulder rivet 107 a capping gate operating link 108, the opposite end of which link is attached to the capping gate operating disk 81 by a shoulder rivet 109. The said capping gate hinge 100 has attached thereto by means of a shoulder rivet 110 an arm 111, the opposite end whereof is attached to the capping gate operating disk 81 by means of a shoulder rivet 112.

When the said gear 84 is turned in a clockwise direction for releasing the shutter, the capping gate operating disk 81 is turned in a contraclockwise direction, thus opening the capping gates 105, 106 through the said connecting arms 108 and 111. In Fig. 3 the said capping gates are represented as open for releasing the shutter.

The camera mechanism herein disclosed is such that the capping gates are caused to be opened and remain open during the time the shutter is operated. For flashlight photography, it is desirable that the capping gates be held open for a short period during the making of a flashlight exposure, the length of this period being greater than the period of time the capping gates would be open during the normal cycle. Therefore, it is necessary to provide means for so holding the capping gates open for flashlight photography, and it is to the means for accomplishing this that the present invention is more particularly directed.

It will be evident that if the capping gates were held open in a normal cycle and the motor electrical circuit were not interrupted but were allowed to continue through a normal cycle, the camera would be injured. I have therefore, in accordance with my invention herein claimed, provided mechanism for engaging the capping gate means, as, for example, one of the two capping gates, and holding the same open, and thereby holding the other capping gate open, and at the same time causing the electrical circuit through the driving motor to be broken. Such mechanism for engaging and holding the capping gate means is, in accordance with my present invention, so constructed and arranged that it can be placed in action or out of action as desired, so that the camera can function in a normal manner or may be adjusted to provide a modified cycle for the making of flashlight exposures.

To that end the shutter curtain 92, shown in detail in Fig. 4, is provided with an enlarged opening 113 so that when making flashlight exposures the light passing through the lens of the camera is unobstructed either by the capping gates or by the curtain shutter, and therefore will fall without interference on the sensitized film indicated at 114.

The said shutter 92 is fully described in the said copending application Ser. No. 476,456, and needs no further description herein, as the details thereof do not constitute a part of the present invention.

I will now refer particularly to the mechanism shown in Figs. 3 to 10 of the drawings, and particularly in Figs. 5 to 10 thereof.

Figure 10:
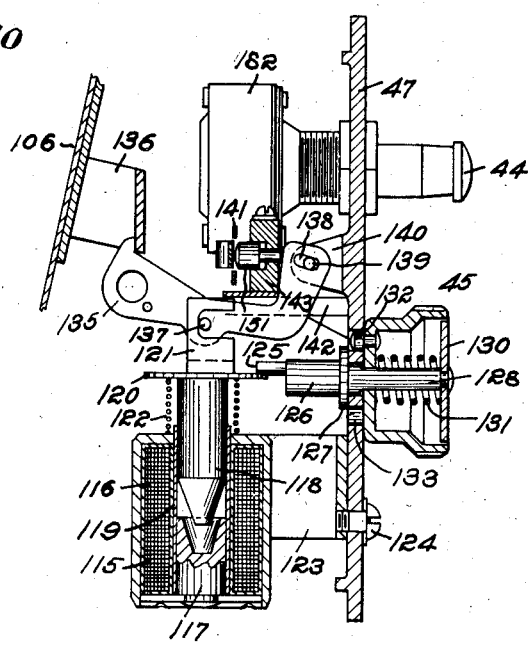
Fig. 10 is a view similar to Fig. 7 but with the parts in a different position, and is a side elevation of Fig. 9.

Attached to the synchronizer mechanism panel or plate 47 is a solenoid magnet 115, shown in greatest detail in Figs. 6, 7 and 10. It is provided with the usual winding 116, shown in Fig. 10, a fixed core 117 and a movable armature 118 free to move in a tube 119. The upper end of the said armature 118 is provided with an enlarged flange 120 and a hook-shaped member 121, and is caused to move in an upward direction by a coil spring 122. The said solenoid magnet 115 is attached to the synchronizer mechanism panel or plate 47 by a bracket 123 and screws 124. The motion of the armature 118 is limited in an upward direction by a pin 125 attached to or forming part of a shaft 126 provided with a flange 127 and an axial extension 128 reaching in a right-hand direction viewing Figs. 6 and 10. The said extension 128 has both sides thereof milled to provide flats to which the knob 45 is fitted, and to the end of said extension 128 is fitted a washer 130 between which and the knob 45, and surrounding the said extension 128, is a coiled spring 131 serving to position the knob 45 against the outside face of the panel or plate 47 and to position the flange 127 against the inside face of the said panel or plate 47. The said knob 45 carries a pin 132 and the panel or plate 47 is provided with index holes 133, 134. When the said pin 132 is in the index hole 134, the stop pin 125 will be in the position shown in Fig. 10, thus allowing the armature to move in an upward direction sufficiently far to cause a pivoted hook member 135 to engage a latch 136 attached to one of the capping gates, in this embodiment of the invention the capping gate 106.

The hook member 135 is provided with a pin 137 acted upon by the hook formation 121 of the armature 118. The opposite end of the hook member 135 is of an L-shape formation and is provided with a transversely extending slotted opening 138, shown in Figs. 6, 7 and 10, through which passes a pin 139 providing a pivot for the said hook member 135. The said pivot pin 139 also passes through a boss 140 provided with a slot 141, shown in Figs. 8 and 9, into which the said hook member 135 is fitted.

When the said knob 45 is in the position shown in Fig. 6, the said pivoted hook member 135 will be held out of engagement with the latch 136, as clearly indicated in Figs. 6 and 7, at which time the pin 132 will engage the index hole 133 of the panel or plate 47. When the knob 45 is in the just described position, shown in Fig. 6, the camera will function in the normal manner or in what is known as the day cycle. When, however, the knob 45 is placed in the position indicated in Figs. 3, 7 and 10, the camera is adjusted for night cycle operation.

Cast integral with the synchronizer panel or plate 47 are bosses or brackets 142, 142, to which a single-pole double-throw switch, indicated at 143, is attached by screws 144, 144. The said switch 143 is a standard switch known in the trade as the "Acro-Switch," and it is provided with two stationary contacts 145, 146, and a movable contact 147 attached to a spring member 148 actuated through a short spring 149 and a semicircular spring 150 through a switch-operating pin 151.

Figure 9:
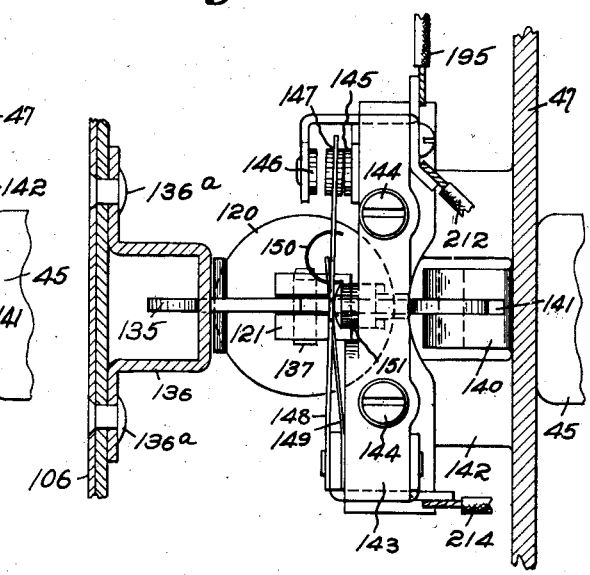
Fig. 9 is a view similar to Fig. 8 but showing the capping gate means engaged by the latching mechanism, the electrical switch being shown in condition to break the motor circuit.

When the said pivoted hook member 135 is engaged by the latch member 136 of the capping gate 106 and said capping gate starts to close, the said hook member 135 is moved in a left-hand direction viewing Fig. 9 on the pin 139, and because of the slotted opening 138, the heel 152 of the hook member 135 engages the pin 151 and moves it in a left-hand direction viewing Figs. 9 and 10, thus deforming the spring 149 in a left-hand direction and causing the position of the semicircular spring 150 to be changed, so that the forces acting upon spring member 148 will be such as to cause said spring member 148 to be moved to the right viewing said Figs. 9 and 10, thus opening the motor circuit and stopping the camera. This action will be described at greater length in connection with the description of the operation of the camera.

When the switch contacts are in the position shown in Fig. 9, the motor circuit is open, but a circuit is partially completed to the solenoid winding 116. Upon completing such circuit, the armature 118 will be caused to be moved downward and the pin 137 will be engaged by the hook 121, thus moving the hook member 135 in a downward direction, disengaging the latching plate 136 of the capping gate 106 and allowing the two capping gates 105, 106 to close. The hook member 135 will now be caused to move in a right-hand direction, viewing the said figures, under the influence of spring 149, allowing the switch-operating pin 151 also to move in a right-hand direction until the parts reach the condition shown in Fig. 8, wherein the spring member 148 has been moved to the left to complete the motor circuit and closing the contacts 146, 147, thus causing the camera cycle again to be restored.

The camera to which my present invention is applied is herein shown and described as a motor driven camera having a normal cycle of operation. That is to say, the shutter is rewound for a second exposure, a new area of film is fed or positioned before the exposure opening, and the camera is then caused to stop by interrupting an electrical circuit to the motor. Upon completion of that circuit to start a new cycle, the capping gates are caused to be opened, and the shutter is then released for making an exposure. After the exposure has been made, the capping gates 105, 106 are caused to be closed, a new area of film is fed or wound into place, the shutter is restored to a set conditon and the camera is again stopped.

The motor drive mechanism 40 is shown or indicated in Fig. 12, but I have not therein shown the motor itself or the flexible shaft that transmits power from the motor to the camera drive mechanism, this being fully disclosed in the said co-pending application now Patent No. 2,371,592, and not being herein claimed.

It is sufficient for the purpose of explaining my present invention to show and describe the mechanism of Fig. 12, reference being also briefly made to Figs. 1 to 2.

The flexible shaft housing is connected to the bushing 39 by a suitable nut and extending through the said housing is a flexible shaft having a squared end that engages a suitable opening 152 of a bushing 153 pinned to a shaft 154 by a pin 155. Suitably attached to the said shaft 154 is a worm 156 meshing with a worm gear 157 having pivotally attached thereto a pawl 158 by rivet 159 and caused to be turned in a clockwise direction by a spring 160. The said pawl 158 engages a ratchet 161 attached to a first interrupted gear 162 meshing with which is a second interrupted gear 163 driven one-half revolution or 180° for each revolution of the said first interrupted gear 162. Attached to the second interrupted gear 163 is a drive plate 163a, shown in dotted line, and serving to drive the gear 54 through the pins 56 as indicated in Fig. 2.

Attached to the first interrupted gear 162 is a cam 164 having a cut-out portion 165, said cam being for the purpose of operating the motor switch 166 which is a single-pole double-throw switch of a construction preferably identical with the switch 143. Said switch 166 is provided with contacts 167, 168 and 169. Riding on the said cam 164 is a switch operating pin 170 having a shoulder 171 and a spring 172 positioned between the shoulder 171 and the body of motor switch 166 and causing the pin 170 to be moved in a right-hand direction so that it can follow the contour of the cam 164. In said Fig. 12, the switch 166 is shown in the condition it has at the completion of a cycle. That is to say, the contacts 168 and 169 will be opened and the contacts 167 and 169 will be closed.

Attached to and revolving with the first interrupted gear 162 is a pin 173 that co-acts with a camera-operating member 174 co-acting (as shown in Fig. 2) with the pin 88 of the shutter release lever 86 for operating the capping gates and for releasing the shutter. As the first interrupted gear 162 starts to turn, the camera-operating member 174 will be caused to rotate in a contraclockwise direction by means of the pin 173, and the shutter release lever 86 will be caused to be rotated in a clockwise direction by the pin 88, thus opening the capping gates 105, 106 and releasing the shutter. As the said first interrupted gear 162 continues to turn, the pin 173 will pass beyond the end of the operating lever 174, allowing the capping gates 105, 106 again to close. The said first interrupted gear 162 will continue to operate until the notch 165 reaches the pin 170, and this causes the contacts 168 and 169 to be opened. The camera will then be caused to stop because of the breaking or interrupting of the electrical circuit to the motor.

I will next describe the circuit diagram that is shown in Fig. 11, and then I will explain completely the operation of my invention that is herein claimed.

There is shown in Fig. 11 a complete circuit diagram of the camera to which the herein claimed invention has been applied without limiting it thereto, and said circuit diagram includes diagrammatically the subject-matter of the present invention.

A battery for supplying electrical energy to the camera is indicated at 175, and at 176, 177 are indicated wires normally connected to the camera driving motor. For the purpose of the present description, it will be assumed that they are so connected and that the driving motor is connected to the film feeding mechanism through a suitable flexible shaft as hereinbefore indicated. Located upon the camera and enclosed by the box-like formation 33, shown in Fig. 1, there is indicated a relay 178 for controlling the electrical current to the motor, and having a solenoid coil 178a. A signal light to indicate to the operator that the camera is functioning is indicated at 179 and at 180 is indicated a switch placed in the operating circuit to prevent the camera from operating after all the film has been exhausted.

Since such switch 180 forms no part of the present herein-claimed invention, it will be assumed for the purpose of this description that said switch 180 is always in the closed condition. As already stated, there is shown at 41 a receptacle provided for the connection of an intervalometer through the cable 181. The receptacle through which the motor is connected to a suitable plug is indicated at 42, and the receptacle through which the power supply is connected through the usual plug is indicated at 43. The fuse 28 is placed at one side of the electrical circuit for protection against overload, short circuits, etc.

It will be assumed that the camera is ready for making an exposure, and that the camera mechanism will be in the condition shown in Fig. 2, and that the motor drive mechanism will be in the condition shown in Fig. 12. The cycle-selecting knob 45 will be in position to indicate the day cycle rather than the night cycle, as actually indicated in Fig. 1. In the described position of the parts, the solenoid armature 115 will be inoperative as previously described. Therefore, the contacts 147 and 145 of the switch 143 will be open and the contacts 146 and 147 will be closed. To enable the operator to operate the camera without completing the circuit through the intervalometer, a switch 182 is provided having contacts 183 and 184 which are closed to start a cycle or to make an exposure. Current will then flow from battery 175 through wire 186, receptacle 43, wire 187, fuse 28, wire 188, wire 189, wire 190, contact 184, contact 183, wire 191, switch 180, wire 192, contact 167, contact 169, and wire 193, through the solenoid of the relay 178a, wire 194, wire 195, contact 146, contact 147, switch arm 148, wire 196, wire 197, receptacle 43, wire 198, and thence to the battery 175. This completes a circuit through the relay 178 and will close the contacts in the relay at which time current will flow to the motor in the manner which will now be described.

Current will now flow from battery 175 through wire 198, receptacle 43, wire 197, receptacle 42, wire 176 and thence through the motor (not shown), wire 177, receptacle 42, wire 199, through the contacts of the relay 178, then through wire 189, wire 188, fuse 28, wire 187, receptacle 43, wire 186 and battery 175. The motor will now start to operate and will turn the first interrupted gear 162 and the cam 164 until the motor switch 166 is caused to be operated through the pin 170.

The contacts of the motor switch 166 will now be in the condition shown in Fig. 11, wherein the circuit is represented as having been broken between the contacts 167 and 169, but contact has been made between the contacts 169 and 168. The circuit to the relay will now be completed around the switch 182 through the wire 200, wire 201 to the wire 188, through the fuse 28, etc. and back to the battery. The motor will continue to operate even though the contacts 183 and 184 of the switch 182 have been opened, until the notch 165 of the cam 164 reaches the position indicated in Fig. 12, wherein the switch operating pin 170 will be moved to the right by the spring 172, thus opening the motor circuit and stopping the motor.

I will next describe the action of the motor when operating on a night cycle.

The shutter curtain is now adjusted for the wide aperture thereof by means of the shutter setting knob 24 and the cycle selector knob 45 is set for the night cycle, as shown in Fig. 1. The camera mechanism will now be in the position shown in Fig. 2, wherein the shutter is fully rewound and is ready for making an exposure. The capping gate latching mechanism will be in the condition shown in Figs. 2 and 7. The camera drive mechanism will be in the position shown in Fig. 12 with the contacts 168 and 169 in the open condition. The camera could be cycled by operating the button 44 of the switch 182, but when making night photographs the camera is usually operated through an intervalometer of any well known type such as that disclosed in the patent to Sherman M. Fairchild, No. 2,048,039, or any other suitable intervalometer.

The intervalometer consists of a driving motor and contacting means that can be set for different intervals of time. For the purpose of this description I herein show a simple circuit of an intervalometer enclosed in dotted lines, Fig. 11, and indicated at 202, it being provided with a switch 203 for closing the circuit from the battery to the motor of the intervalometer. Such switch is usually closed by automatic means connected to the bomb-releasing mechanism of the airplane carrying the camera, but it can be momentarily closed by the bombardier when the bomb is released.

The intervalometer motor 204 will then be caused to operate and at a predetermined time the switch 205 will be closed, thus completing the circuit around the switch 182 through the wire 206, wire 207, switch 205, wire 209 and wire 201. The switch 182 will then be short circuited and will perform just as if the contacts 183 and 184 were closed, thus causing the camera to cycle in the manner previously disclosed. That is to say, the camera motor will start to operate, turning the gear 157 and the cam 164 until the switch operating pin 170 is caused to be moved to the left by cam 164, thus closing the contacts 168 and 169, thereby completing the circuit to the motor through the motor switch 166. The camera motor will now continue to operate even though the switch 205 is opened by the intervalometer. As the camera continues to operate, the pin 173 carried by the first interrupted gear 162 will be turned in a clockwise direction, engaging the camera operating lever 174, which is caused to be moved in a contraclockwise direction and the camera shutter release lever 86 is caused to be moved in a clockwise direction through the pin 88.

As the camera release lever 86 moves in a clockwise direction, the capping gates 105, 106 are caused to be opened, and when they reach their fully opened condition the shutter is released and the shutter curtain 92 will travel to the position shown in Fig. 3 wherein the wide open slot 113 will be in position before the camera exposure opening. The shutter curtain 92 will be held in this position until the camera is recycled.

As the capping gate 106 is caused to open and consequently opens capping gate 105, the hook member 135 is moved downward by the latching plate 136, and as the capping gate 106 starts to move in a left-hand direction viewing Fig. 3, the latching plate 136 will be engaged by the hook member 135 and thus prevents the closing of the capping gates 105, 106, causing the hook member 135 to be moved to the left viewing Fig. 10 and causing the switch operating button 151 to be moved to the left, as will also be moved the switch spring 149, thus operating the switch 143 to open the contacts 146 and 147 and to close the contacts 145 and 147. The motor will now be stopped and the circuit will be in the condition shown in Fig. 11, wherein the contacts 168 and 169 are closed, the contacts 145 and 147 are closed, and the contacts 146 and 147 are opened, thus opening the circuit to the coil 178a of the motor relay 178, thus stopping the motor.

The camera will remain in this condition until the circuit is again closed at the switch 205 or at a second remote switch 210 to be subsequently referred to. As the switch 205 is closed, a circuit will be completed across the wires 207 and 209. Current will then flow from battery 175 through wire 186, wire 187, fuse 28, wire 188, wire 201, wire 209, switch 205, wire 207, wire 206, wire 191, switch 180, wire 192, wire 211 to the solenoid 115, wire 212, contacts 145 and 147, switch arm 148, wire 196, wire 197 and wire 198. This will complete a circuit to the solenoid magnet 115, thus operating the hook member 135, thereby disengaging the capping gate 106 which will be allowed to close, together with the capping gate 105. The contacts 145 and 147 will be opened and the contacts 146 and 147 will be closed. The camera motor will now be caused to operate because the contacts 168 and 169 of the motor switch 166 are closed and will remain closed until the notch 165 of the cam 164 reaches the switch operating pin 170, at which time the contacts 168 and 169 will be opened, thus stopping the camera motor, and at this time the camera will have been completely recycled. That is to say, the shutter curtain will have been rewound and a new area of sensitized material will be fed into position for a second photograph.

The circuit to the motor 204 of the intervalometer is completed through wire 209, motor 204, switch 203, wire 213 to the wire 214 which connects to the common wire 196, and the wire 209 which connects to the other common wire. Thus upon the closing of the switch 203 the intervalometer will be caused to operate.

Such intervalometer is so constructed that it can be set for any number of contacts. For example, if the intervalometer is set to make one contact and then to stop, the camera will be caused to stop with the full open aperture of the curtain in position for making an exposure, and the capping gates 105, 106 will be held open and they may and will if desired be caused to be closed by momentarily completing a circuit at the second remote switch 210, or if desired, within the scope and purpose of my invention, a photocell is connected to an amplifier and relay, thereby to cause the second remote switch 210 to be short circuited, thus allowing the capping gates 105, 106 to be closed and the camera to recycle.

Such photocell, when employed by me in the practice and within the scope of my invention, is operated by the light radiating or emanating from the flash bomb dropped from the airplane, thus causing the capping gates 105, 105 to be closed instantly after the flash of the bomb.

In Fig. 11A is represented a circuit diagram which is the same in all respects as the diagram of Fig. 11, excepting that instead of an intervalometer, there is provided a photocell, amplifier and relay, as therein indicated. The reference numerals upon said circuit diagram are otherwise the same as those on Fig. 11, and hence need not be again specifically referred to.

Another mode of operation within the practice and scope of my present invention is so to adjust or set the intervalometer that a predetermined time after the bomb has been released, the switch 205 will be momentarily closed, thus causing the camera to operate until it is stopped by the capping gate latching mechanism, and a second contact is caused to take place at the switch 205 at a predetermined time, depending upon the altitude of the airplane when the bomb is dropped. This will cause the capping gates to be released in the manner previously described, thus causing the camera to recycle, thereby rewinding the shutter and feeding a new area of film which will be stopped for a second exposure.

The foregoing constitutes novel means of my sole invention for synchronizing aerial cameras of the construction disclosed in the said co-pending application now Patent No. 2,371,592, with the light of a flash bomb dropped from an airplane. The camera having such synchronizing means of my invention has been used in service by the armed forces of the United States and has proven highly satisfactory.

For flashlight photography the capping gates are held open for a period greater than during the normal cycle. At the same time the capping gates are held open, the circuit through the camera driving motor is stopped. The mechanism for engaging the capping gates and stopping the motor can be put into action and out of action as desired. When put in action it is for the purpose of flashlight exposures. The wide opening of the curtain shutter is used for flashlight pictures but no details of the shutter are herein claimed. When the hook member 135 is engaged by the latch member 136 of the capping gate 105, through switch 148, the camera motor is stopped, but a circuit is completed to the solenoid winding 116, disengaging the latching plate 136 and allowing the two capping gates to close. Then the motor circuit is completed, through movement of the switch operating pin 151, closing the contacts 146, 147, causing the camera cycle again to be restored.

For a normal cycle the shutter curtain is rewound, a new area of film is fed and the camera is then stopped by interrupting an electrical circuit to the camera motor. In order to carry out such normal cycle, the circuit is completed, the capping gates are opened and the shutter is released. Then the capping gates are closed, a new area of film is fed, the shutter is restored to set condition and the camera is again stopped.

The motor switch 166 is operated by the pin 170 acted upon by the cam 164. At the end of a cycle contacts 168 and 169 are opened and the contacts 167, 169 are closed. The shutter release lever 86 is turned by the pin 88, opening the capping gates 105, 106 and releasing the shutter which had been closed by the spring therefor, then closing the capping gates and opening the contacts 168, 169, stopping the camera motor. Assuming that the cycle selecting knob 45 is set for a day cycle, the solenoid armature 115 is inoperative (the contacts 147 and 145 of switch 143 being open and the contacts 146 and 147 being closed). To enable the operator to act without completing the circuit through the intervalometer (the receptacle wherefor is indicated at 41), there is provided the switch 182 having contacts 183, 184 to be closed to start a cycle. When said contacts 183, 184 are closed, a circuit is completed through the relay 178, so that current will flow to the motor which turns the first interrupted gear 162 and cam 164 until the motor switch 166 is operated through pin 170, thus breaking the circuit between the contacts 167, 169, but making contact between the contacts 169, 168. This completes the circuit to the relay 178 around the switch 182. Therefore the motor continues to operate until switch operating pin 170 is moved to the right, opening the circuit and stopping the motor.

For a night cycle, the curtain shutter is adjusted for the wide aperture thereof by the knob 24 and the knob 45 is set for a night cycle. The curtain shutter is now in fully rewound condition and is ready for exposure. The contacts 168, 169 are open and the camera is to be operated by the intervalometer, but can be cycled by the button 44 of the switch 182.

The intervalometer has a switch 203 that is to be closed by automatic means connected to the bomb releasing mechanism or it can be closed by the bombardier. The intervalometer motor 204 is operated, closing the switch 205 at a predetermined time, completing the circuit around the switch 182, causing the camera to cycle; that is, the camera motor starts, turning the cam 164 until the pin 170 is moved to the left, closing the contacts 168, 169 and thus completing the circuit, and the camera motor continues to operate even though the switch 205 is opened by the intervalometer. As the camera motor continues to operate, the pin 173 moves the lever 174, moving the shutter release lever 86 through the pin 88. This opens the capping gates 105, 106, and when fully open, the curtain shutter is released and the curtain travels to the position shown in Fig. 3, wherein its wide slot 113 is in position before the camera exposure opening, and the curtain is held in such position until the camera is recycled.

As the capping gates 105, 106 open and as the capping gate 106 starts to close, the latching plate 136 is engaged by the hook member 135, thereby preventing the closing of the capping gates 105, 106, but the switch operating button 151 is moved to the left, operating the switch 143, thus stopping the camera-driving motor. The camera remains in this non-functioning condition until the circuit is again closed at the switch 205 or at the remote control switch 210. When the switch 205 is thus closed, a circuit is completed across wires 207, 209, thus completing a circuit to the solenoid magnet 115, operating the hook member 135, disengaging the capping gate 106, thus permitting it to close with the gate 105. The camera motor now operates because the contacts 168, 169 of the motor switch 166 are closed and they remain closed until the cam 164 acts on the pin 170 to open the contacts 168, 169, thereby to stop the camera motor, the camera now having been completely recycled because the curtain shutter has been rewound, and a new area of film fed, and the intervalometer is caused to operate—that is, it is placed in condition for carrying out its function. The intervalometer is of a type such that it can be set for any number of contacts, whether one or more. If set for one contact, it then stops after functioning, and the camera stops with the full open aperture 113 of the curtain shutter in exposure position and the capping gates 105, 106 will be held open, as described, and they can be closed through the remote control switch 210, or a photocell (not shown) can be used to control the remote control switch 210, thus allowing the capping gates 105, 106 to be closed and the camera to recycle. Such photocell is operated by light radiating from a flash bomb, or, if desired, the intervalometer can be set so that at a predetermined time after the bomb is released, the switch 205 is closed, causing the camera to operate until it is stopped by the capping gate latching mechanism, and a second contact takes place at the switch 205 at a predetermined time, causing the capping gates 105, 106 to be released as described, and the camera to recycle by rewinding the curtain shutter and feeding the film.

It is to be understood that my invention is not limited to an automatic, flash-operated camera. In its broader aspect it includes a curtain shutter having release means and winding means, means to support a film and means to cause a new area of the film to be fed before the exposure opening during each camera cycle, capping gates, means for opening said capping gates and spring means for closing said capping gates. There is also provided latching means for holding the capping gates in the said open condition and a solenoid magnet for releasing said capping gates from the latching means to permit them to close. An electrical switch is provided controlled by the said capping gates for interrupting the electrical circuit, also a motor and a source of electrical potential and circuiting means for such motor. Means is provided under the control of the operator for selectively controlling the camera cycle, thereby changing from a normal cycle wherein a circuit is completed to the camera motor so as first to cause the capping gates to be opened, then releasing the curtain shutter and allowing it to open and close and the capping gates to close, then rewinding the curtain shutter and feeding a new area of film before the exposure aperture. In the modified cycle, the capping gates are caused to be opened, the curtain shutter is released and is permitted to run to the open condition thereof. The capping gates start to close but are prevented from doing so by the said latching means. The motor circuit is then opened, allowing the camera motor to stop, thus completing the first part of the camera cycle. Upon the completion of a circuit to the solenoid of the said latching means, the capping gates are allowed to be closed. When the capping gates are released by the latching means to permit said gates to close, the circuit is again restored to the camera motor, thus allowing the camera to complete its modified cycle.

Having thus described a single embodiment of my invention, it is to be understood that although specific terms are employed, they are used in a generic and descriptive sense and not for purposes of limitation, the scope of the invention being set forth in the following claims.

I claim:

1. A photographic camera provided with the following, in combination: film-covering means including a curtain shutter; releasing means and rewinding means for said shutter; means to support and to feed a film in a succession of exposure cycles; a motor operatively connected to said shutter and to said film feeding means to release said shutter, to rewind the same and to feed into position an unexposed area of film, in each of a succession of photographic cycles; means which is effective to increase the length of time the film is exposed, said means being responsive to the action of a flashlight to cause the resumption of the action of the camera in any cycle of such succession of cycles in which a flashlight acts upon the said means responsive thereto, said mechanism acting to interrupt the camera cycle when the shutter is in the open condition with the sensitized material uncovered for exposure, and acting thereafter, because of the action of said flashlight, to cause the resumption of said cycle, whereby, in such cycle in which a flashlight acts upon the means responsive thereto, the period during which the film is displayed for exposure is compensatingly increased.

2. A photographic aerial camera provided with a focal-plane curtain shutter, releasing means for said shutter, rewinding means for said shutter, means to support a film and to feed the film for exposure in each of a succession of photographic cycles, an electric motor with circuiting means connected to a source of potential, means controlled by said motor to release said shutter, to rewind the said shutter and to feed the film, all in each of a succession of cycles, thereby performing the steps of said cycles, and means to modify the cycle by interrupting the camera cycle when the shutter is in the open condition, thereby uncovering the sensitized material for exposure, photoelectric cell means, and circuiting means to cause the camera cycle to be resumed when the photoelectric cell means is acted on by a light source that is also used to make the photograph, thereby terminating the exposure.

3. In a photographic camera of the aerial type, the following: a curtain shutter having release means and rewinding means, and means to support a film and to feed an unexposed leading area thereof, all acting in each of a succession of photographic cycles; an electric motor, electric circuiting means therefor adapted to be connected to a source of potential; said camera having means which is effective to increase the length of time the film is exposed, said means being responsive to the action of a flashlight to cause the resumption of operation of the camera, capping gate means in advance of the curtain shutter, means to open and to close said capping gate means in each cycle, and means acted upon by said means responsive to a flashlight for controlling the closing of the capping gate means in a cycle in which the means responsive to a flashlight acts, whereby the said capping gate means remain open longer, in the cycle in which said means responsive to a flashlight acts, than the capping gate means remains open in normal cycles, i. e. in which no flashlight acts upon said means responsive thereto.

4. In a photographic camera of the aerial type wherein there is provided an electric motor to operate the functioning parts of the camera in a succession of cycles, a curtain shutter having releasing means and rewinding means, means to support a film and to feed an unexposed leading area thereof, all in each of such succession of cycles, a pair of capping gates to exclude from the film the light coming through the objective lens and positioned between the objective lens and the curtain shutter, means to open the capping gates for a part of each cycle of said succession of cycles, means to hold said capping gates open in a modified cycle of the said succession of cycles, and synchronizing means responsive to a flashlight, such as from an exploded bomb dropped from the airplane having such camera, to release such holding means for said capping gates, whereby said capping gates are held open in such modified cycle for a period which is longer than the capping gates are open in each of the unmodified cycles, thereby lengthening the period the film is uncovered for exposure in the modified cycle.

5. A photographic aerial camera provided with a focal plane curtain shutter, releasing means for said shutter, rewinding means for said shutter, means to support a film and feed the film for exposure in each of a succession of photographic cycles, an electric motor with circuiting means connected to a source of potential, means controlled by said motor to release said shutter, to rewind the said shutter and to feed the film, all in each of a succession of cycles, thereby performing the steps of said cycles, and including means acting in each of said cycles to make the film-display period of the same length, means which is effective to vary the length of time the film is exposed, said means being also responsive to the action of a flashlight to cause the resumption of operation of the camera in a predetermined one at least of such succession of cycles by acting to interrupt such cycle when the shutter is in the open condition with the sensitized material uncovered for exposure and thereafter to resume such cycle, whereby the camera is adapted for day photography when using the non-modified cycles, and also for flashlight night photography when using the modified cycle.

6. A photographic aerial camera provided with a focal plane curtain shutter, releasing means for said shutter, rewinding means for said shutter, means to support a film and feed the film for exposure in each of a succession of photographic cycles, an electric motor with circuiting means connected to a source of potential, means controlled by said motor to release said shutter, to rewind the said shutter and to feed the film, all in each of a succession of cycles, thereby performing the steps of said cycles, and including means acting in each of said cycles to make the film display period of the same length, means which is effective to increase the length of time the film is exposed, said means being also responsive to the action of a flashlight to cause the resumption of operation of the camera in a predetermined one at least of such succession of cycles by acting to interrupt such cycle when the shutter is in the open condition with the sensitized material uncovered for exposure and thereafter to resume such cycle, whereby the camera is adapted for day photography when using the non-modified cycles, and also for flashlight night photography, when using the modified cycle.

7. A photographic camera according to claim 4, but wherein the means to hold the capping gates open includes latching means for the capping gates, and wherein means are provided to permit said latching means to function so as to hold said capping gates open for a lengthened time interval in a modified cycle.

8. A photographic camera according to claim 4, but wherein the means to hold the capping gates open includes a latch adapted to engage one of the capping gates to hold said gates open for a lengthened time interval in a modified cycle, and wherein there is an electric motor circuit having a switch controlling the beginning of the engagement of the said latch with one of said capping gates.

9. A photographic structure according to claim 4, but wherein the means to hold the capping gates open includes a latch to engage one of the capping gates to hold said gates open for a lengthened time interval in a modified cycle, and wherein there is provided an electric circuit having a switch and means controlled thereby for effecting the engagement of said latch with one of said gates, and wherein there is provided a light-sensitive element to effect the closing of contacts of the electric circuit, and the disengagement of the latch from such capping gate.

10. A photographic structure according to claim 4, but wherein there is provided in the electric circuiting means a main switch automatically opened and closed once for each functioning cycle of the camera to stop and start the electric motor, and wherein, included in the means to hold the capping gates open in a modified cycle of said succession of cycles, there are provided latching means to hold said capping gates open in such modified cycle of said succession of cycles for a period extending beyond the time of closing said capping gates in the usual way at the end of each unmodified functioning cycle, thereby lengthening in such modified cycle the period the film is uncovered for exposure.

11. A photographic aerial camera provided with a focal plane curtain shutter, releasing means for said shutter, rewinding means for said shutter, means to support a film and feed the film for exposure in each of a succession of photographic cycles, an electric motor with circuiting means connected to a source of potential, means controlled by said motor to release said shutter, to rewind the said shutter and to feed the film, all in each of a succession of cycles, thereby performing the steps of said cycles, and including means acting in each of said cycles to make the film-display period of the same length, the camera having capping gate means to exclude from the film light rays entering through the objective lens, means to open the capping gate means for a part of each cycle, and means responsive to a flashlight to vary the length of time the capping gate means is held open in a predetermined cycle, thereby varying the length of time the film is uncovered for exposure in and for such predetermined cycle.

12. A photographic aerial camera provided with a focal plane curtain shutter, releasing means for said shutter, rewinding means for said shutter, means to support a film and feed the film for exposure in each of a succession of photographic cycles, an electric motor with circuiting means connected to a source of potential, means controlled by said motor to release said shutter, to rewind the said shutter and to feed the film, all in each of a succession of cycles, thereby performing the steps of said cycles, and including means acting in each of said cycles to make the film-display period of the same length, the camera having capping gate means to exclude from the film the light rays entering through the objective lens, means to open the capping gate means for a part of each cycle, and means responsive to a flashlight to increase the length of time the capping gate means is held open in a predetermined cycle, thereby varying the length of time the film is uncovered for exposure in and for such predetermined cycle.

13. A photographic aerial camera provided with a focal plane curtain shutter, releasing means for said shutter, rewinding means for said shutter, means to support a film and feed the film for exposure in each of a succession of photographic cycles, an electric motor with circuiting means connected to a source of potential, means controlled by said motor to release said shutter, to rewind the said shutter and to feed the film, all in each of a succession of cycles, thereby performing the steps of said cycles, and including means acting in each of said cycles to make the film-display period of the same length, the camera having capping gate means to exclude from the film the light rays entering through the objective lens, means to open the capping gate means for a part of each cycle, means responsive to a flashlight to hold the capping gate means open in a modified cycle for a length of time in excess of that during which the capping gate means is open in an unmodified cycle operation of the aerial camera, and synchronizing means to permit said capping gates to close in accordance with the functioning of the flashlight acting in such modified period.

14. A photographic aerial camera provided with a focal plane curtain shutter, releasing means for said shutter, rewinding means for said shutter, means to support a film and feed the film for exposure in each of a succession of photographic cycles, an electric motor with circuiting means connected to a source of potential, means controlled by said motor to release said shutter, to rewind the said shutter and to feed the film, all in each of a succession of cycles, thereby performing the steps of said cycles, and including means acting in each of said cycles to make the film-display period of the same length, the camera having capping gate means to exclude from the film the light rays entering through the objective lens, means to open the capping gate means for a part of each cycle, capping gate holding means to increase the length of time the capping gate means is open in a predetermined cycle, in order to lengthen the period the film is uncovered for exposure, as when operating with a flashlight at night, means responsive to a flashlight to terminate in the predetermined cycle the holding action of said capping gate holding means, and means to break the circuit to the said electric motor for the lengthened period the capping gate means is held open.

15. A photographic aerial camera provided with a focal plane curtain shutter, releasing means for said shutter, rewinding means for said shutter, means to support a film and feed the film for exposure in each of a succession of photographic cycles, an electric motor with circuiting means connected to a source of potential, means controlled by said motor to release said shutter, to rewind the said shutter and to feed the film, all in each of a succession of cycles, thereby performing the steps of said cycles, and including means acting in each of said cycles to make the film-display period of the same length, the camera having capping gate means to exclude from the film the light rays entering through the objective lens, means to open the capping gate means for a part of each cycle, capping gate holding means to increase the length of time the capping gate means is open in a predetermined cycle in order to lengthen the period the film is uncovered for exposure as when operating with a flashlight at night, means to break the circuit to the said electric motor for the lengthened period the capping gate means is held open, and means to render operative or inoperative at will the said means to break the circuit to the electric motor, so that the aerial camera may function in a normal cycle, or in a modified cycle for making flashlight exposures.

16. A photographic camera in accordance with claim 1, but wherein the camera is provided, in addition to said curtain shutter and as constituting a part of the film-covering means, with capping gate means located between said curtain shutter and the objective lens of the camera, and wherein means is provided to open said capping gate means in each exposure cycle at a time to admit light to the positioned, unexposed area of film for that cycle, and wherein the means responsive to a flashlight governs the length of time said capping gate means is maintained open in the cycle wherein a flashlight acts upon the said means responsive thereto.

17. A photographic camera in accordance with claim 1, but wherein the said motor is an electric motor in electric circuit with a source of potential, and wherein there is, in and controlled by said electric circuit, means to terminate the period the film is displayed for exposure by a part of the film-covering means in any cycle of such succession of cycles in which a flashlight acts upon the said means responsive thereto.

18. A photographic camera in accordance with claim 1, but wherein the said motor is an electric motor in electric circuit with a source of potential, and wherein there is, in and controlled by said electric circuit, means to terminate the period the film is displayed for exposure by a part of the film-covering means in any cycle of such succession of cycles in which a flashlight acts upon the said means responsive thereto, and wherein as a part of the film-covering means the said camera is provided with capping gate means located between said curtain shutter and the objective lens of the camera, and wherein means is provided to maintain said capping gate means open until the flashlight acts upon the said means responsive thereto.

19. In a photographic camera of the aerial type provided with a casing, an objective lens, and an exposure opening, the following in combination: a curtain shutter having release means and winding means, and means to support a film and to feed an unexposed leading area thereof before the exposure opening of the camera, all during each camera cycle, whether normal or modified; capping gate means interposed between the objective lens and the positioned film; means for opening the capping gate means and means for closing said capping gate means; latch-like means for holding the capping gate means in open condition; an electric camera-operating motor with electric circuiting means therefor connected to a source of potential; a solenoid magnet in said electric circuiting means co-acting with said latch-like means to hold said capping gate means open in one position of the said solenoid and to release said latch-like means in the other position of said solenoid so as to permit the capping gate means to be closed by the action of the means for closing said capping gate means; an electrical switch in said electric circuiting means which is controlled by said capping gate means for interrupting the electrical circuit; means under the control of the operator for selectively controlling the said camera cycles so as thereby to change from a normal camera cycle (wherein a circuit is completed to the camera-operating motor to cause the capping gate means to be opened, the curtain shutter to be released, the capping gate means to be closed, the curtain shutter to be rewound, and a new area of film fed before the camera exposure opening) to a modified camera cycle, wherein the capping gate means is opened, the curtain shutter is released and is permitted to run to an open condition thereof at the said exposure opening, and wherein the capping gate means starts to close but is prevented from closing by the action of the said latch-like means, and wherein the motor circuit is then opened, allowing the said camera-operating motor to stop, thereby completing the first part of the said modified cycle, and wherein upon the completion of a circuit to the solenoid for the said latch-like means the capping gate means is allowed to be closed, and wherein when the capping gate means is released by the said latch-like means the electric circuit is again restored to the said camera-driving motor, thus allowing the camera to complete its said modified cycle.

20. A combination according to claim 19, but wherein the means to close the capping gate means is spring actuated.

21. A combination according to claim 19, but wherein a manually operated button-like member is provided, to be operated by a bombardier or other authorized person, to close the circuit to the said solenoid magnet, thereby permitting the capping gate means to be closed by the said closing means therefor.

22. A combination according to claim 19 but wherein the capping gate means consists of two pivoted gates opening away from and closing toward each other.

23. A combination according to claim 19, but wherein the curtain shutter consists of a single curtain having at least one narrow opening for instantaneous exposure, to be used in the normal cycles, and having a wider opening to be used in the modified cycles.

24. In a photographic camera of the aerial type provided with a casing, an objective lens, and an exposure opening, the following, in combination: a curtain shutter having release means and winding means, and means to support a film and to feed an unexposed leading area thereof before the exposure opening of the camera, all during each camera cycle, whether normal or modified; capping gate means interposed between the objective lens and the positioned film; means for opening the capping gate means and means for closing said capping gate means; latch-like means for holding the capping gate means in open condition; an electric camera-operating motor with electric circuiting means therefor connected to a source of potential; a solenoid magnet in said electric circuiting means co-acting with said latch-like means to hold said capping gate means open in one position of the said solenoid and to release said latch-like means in the other position of said solenoid so as to permit the capping gate means to be closed by the action of the means for closing said capping gate means; an electrical switch in said electric circuiting means which is controlled by said capping gate means for interrupting the electrical circuit; and intervalometer for selectively controlling the said camera cycles so as thereby to change from a normal cycle (wherein a circuit is completed to the camera-operating motor to cause the capping gate means to be opened, the curtain shutter to be released, the capping gate means to be closed, the curtain shutter to be rewound, and a new area of film fed before the camera exposure opening), to a modified camera cycle, wherein the capping gate means is opened, the curtain shutter is released and is permitted to run to an open condition thereof, and wherein the capping gate means starts to close but is prevented from closing by the action of the said latch-like means, and wherein the motor circuit is then opened, allowing the said camera-operating motor to stop, thereby completing the first part of the said modified cycle, and wherein upon the completion of a circuit to the solenoid for the said latch-like means the capping gate means is allowed to be closed, and wherein when the capping gate means is released by the said latch-like means the electric circuit is again restored to the said camera-driving motor, thus allowing the camera to complete its said modified cycle.

25. In a photographic camera of the aerial type provided with a casing, an objective lens, and an exposure opening, the following, in combination: a curtain shutter having release means and winding means, and means to support a film and to feed an unexposed leading area thereof before the exposure opening of the camera, all during each camera cycle, whether normal or modified; capping gate means interposed between the objective lens and the positioned film; means for opening the capping gate means and means for closing said capping gate means; holding means to hold the capping gate means in open condition; an electric camera-operating motor with electric circuiting means therefor connected to a source of potential; a solenoid magnet in said electric circuiting means co-acting with said holding means to hold said capping gate means open in one position of the said solenoid and to release said holding means in the other position of said solenoid, so as to permit the capping gate means to be closed by the action of the means for closing said capping gate means; an electrical switch in said electric circuiting means, which is controlled by said capping gate means for interrupting the electrical circuit; means under the control of the operator for selectively controlling the said camera cycles so as thereby to change from a normal camera cycle (wherein a circuit is completed to the camera-operating motor to cause the capping gate means to be opened, the curtain shutter to be released, the capping gate means to be closed, the curtain shutter to be rewound, and a new area of film fed before the camera exposure opening) to a modified camera cycle wherein the capping gate means is opened, the curtain shutter is released and is permitted to run to an open condition thereof at the said exposure opening, and wherein the capping gate means starts to close but is prevented from closing by the action of the said holding means, and wherein the motor circuit is then opened, allowing the said camera-operating motor to stop, thereby completing the first part of the said modified cycle, and wherein upon the completion of a circuit to the solenoid for the said holding means the capping gate means is allowed to be closed, and wherein when the capping gate means is released by the said holding means the electric circuit is again restored to the said camera-driving motor, thus allowing the camera to complete its said modified cycle.

26. In a photographic camera of the aerial type provided with a casing, an objective lens, and an exposure opening, the following, in combination: a curtain shutter having release means and winding means, and means to support a film and to feed an unexposed leading area thereof before the exposure opening of the camera, all during each camera cycle, whether normal or modified; capping gate means interposed between the objective lens and the positioned film; means for opening the capping gate means and means for closing said capping gate means; holding means to hold the capping gate means in open condition; an electric camera-operating motor with electric circuiting means therefor connected to a source of potential; a solenoid magnet in said electric circuiting means co-acting with said holding means to hold said capping gate means open in one position of the said solenoid and to release said holding means in the other position of said solenoid, so as to permit the capping gate means to be closed by the action of the means for closing said capping gate means; an electrical switch in said electric circuiting means, which is controlled by said capping gate means for interrupting the electrical circuit; means for selectively controlling the said camera cycles so as thereby to change from a normal camera cycle (wherein a circuit is completed to the camera-operating motor to cause the capping gate means to be opened, the curtain shutter to be released, the capping gate means to be closed, the curtain shutter to be rewound, and a new area of film fed before the camera exposure opening) to a modified camera cycle wherein the capping gate means is opened, the curtain shutter is released and is permitted to run to an open condition thereof at the said exposure opening, and wherein the capping gate means starts to close but is prevented from closing by the action of the said holding means, and wherein the motor circuit is then opened, allowing the said camera-operating motor to stop, thereby completing the first part of the said modified cycle, and wherein upon the completion of a circuit to the solenoid for the said holding means the capping gate means is allowed to be closed, and wherein when the capping gate means is released by the said holding means the electric circuit is again restored to the said camera-driving motor, thus allowing the camera to complete its said modified cycle.

27. A combination in accordance with claim 26, but wherein the means for completing a circuit to the solenoid magnet for the purpose of releasing the capping gate means and thereby completing a modified cycle is a photocell.

28. A photographic aerial camera in accordance with claim 2, but wherein an intervalometer with a switch closing the circuit to the motor is provided for operating the camera in the modified cycle.

29. A photographic aerial camera in accordance with claim 2, but wherein an intervalometer with a switch closing the circuit to the motor is provided for operating the camera in the modified cycle, and wherein the said switch has means for automatically closing the same through the operation of the bomb releasing mechanism of the airplane carrying the camera.

30. A photographic aerial camera in accordance with claim 2, but wherein there are provided an amplifier and relay in cooperative relation with the photoelectric cell means.

31. A photographic aerial camera in accordance with claim 2, but wherein an intervalometer with a switch closing the circuit to the motor is provided for operating the camera in the modified cycle, and wherein the intervalometer is adjustable, so that at a predetermined time after the bomb has been released a switch of the circuit will be momentarily closed by the intervalometer to cause the camera to operate.

32. A photographic aerial camera in accordance with claim 2, but wherein capping gate means are provided to exclude from the film light rays entering through the objective lens, and wherein means are provided to open said capping gate means in each functioning cycle before the exposure is made, and wherein, for the production of the modified cycle, means are provided to latch open said opened capping gate means, thereby providing for an increase in the length of the film-displayed period of such modified cycle, and wherein means are provided automatically to stop the motor during such modified cycle.

OSCAR STEINER.